US007689552B2

(12) United States Patent
Brealey et al.

(10) Patent No.: US 7,689,552 B2
(45) Date of Patent: Mar. 30, 2010

(54) UDDI METADATA QUERY DEVELOPMENT

(75) Inventors: Christopher Lawrence Brealey, Markham (CA); Yen Lu, North York (CA); Jason Ashley Sholl, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 10/926,158

(22) Filed: Aug. 25, 2004

(65) Prior Publication Data
US 2006/0047619 A1     Mar. 2, 2006

(51) Int. Cl.
*G06F 17/30* (2006.01)
(52) U.S. Cl. ............................................. 707/4
(58) Field of Classification Search ............... 709/1, 709/224, 225; 707/2, 3, 104.1, 4, 1
See application file for complete search history.

(56) References Cited

U.S. PATENT DOCUMENTS

| | | | |
|---|---|---|---|
| 7,010,568 B1 * | 3/2006 | Schneider et al. ............ 709/203 |
| 2002/0174117 A1 | 11/2002 | Nykanen ........................ 707/4 |
| 2003/0065774 A1 * | 4/2003 | Steiner et al. ................. 709/225 |
| 2003/0187839 A1 | 10/2003 | Zhang et al. ................... 707/4 |
| 2003/0191677 A1 | 10/2003 | Akkiraju et al. ................ 705/8 |
| 2004/0064554 A1 * | 4/2004 | Kuno et al. ................... 709/225 |
| 2004/0267719 A1 * | 12/2004 | Doherty et al. ................ 707/3 |

2006/0004722 A1 * 1/2006 Betts et al. ..................... 707/3

FOREIGN PATENT DOCUMENTS

WO        WO/0293290        5/2002

OTHER PUBLICATIONS

Microsoft Computer Dictionary, Fifth Edition.*
"The Web Service Discovery Architecture", Wolfgang Hoschek, Cern It Division, European Organization for Nuclear Research, wolfgand.hoscheck@cern.ch*,;2002, pp. 1-15.
"An Approach to Lightweight Deployment of Web Services", Kleindienst, J. et al.; 2002.
"Profiles for the Situated Web", Suryanarayana, L.; 2002 pp. 200-209.
Inspec (AN-7604575) International Symposium Multimedia Software Engineering 4th, Newport Beach, Dec. 11-13, 2002, Hong Cai et al., "Session Initiation Protocol and Web Services for Next Generation Multimedia Applications", pp. 70-80.
Inspec (AN7561576) Technologies for E-Services, International Workshop, 3rd, Hong Kong, Aug. 23-24, 2002, TES 2002 Proceedings (Lecture Notes in Computer Science, vol. 2444, Dogac, A. et al.
Inspec (AN 7466136) Meta-data on the Semantic Web and its Usage, Matsui, K. et al., vol. 43, No. 7.

(Continued)

*Primary Examiner*—Etienne P LeRoux
(74) *Attorney, Agent, or Firm*—Stephen A. Calogero, Esq.; Steven M. Greenberg, Esq.; Carey, Rodriguez, Greenberg & Paul, LLP

(57) ABSTRACT

A query for data in a UDDI registry is developed. A URI query having parameters that identify the data is provided. A UDDI query having a UDDI specified format based on the parameters in the URI query is generated. The UDDI query is sent to the UDDI registry.

12 Claims, 4 Drawing Sheets

OTHER PUBLICATIONS

Inspec (AN7379598) IEEE International Workshop on Advanced Issues of E-Commerce and Web-based Information Systems, 4$^{th}$, Newport Beach, Jun. 26-28, 2002, Proceedings of WECWIS 2002, Zhang, L. J. et al., XML-Based Advanced UDDI Search Mechanism for B2B Integration.

Inspec (AN7222410) IEEE Internet Computing, Curbera, F. et al., vol. 6, issue, 2, Mar./Apr. 2002, pp. 86-93, Unraveling the Web Services Web: s Introduction to SOAP, WSDL and UDDI.

Inspec (AN7186431) EDN, Issue 28, Dipert, B., "Cutting-edge Consoles Target the Television", Dec. 20, 2001, pp. 47-54.

Inspec (AN7678997) Web Services, E-Business, and the Semantic Web. CaiSE 2002 International Workshop., Toronto, May 27-28, 2002, Paolucci, M. et al., Importing the Semantic Web in UDDI.

Inspec (AN7679677) Web-Services, and Database Systems. NoDe 2002 Web and Database-related Workshops, Erfurt, Germany, Oct. 7-10, 2002, Revised Papers (Lecure Notes in Computer Science, vol. 2593, Jeckle, M. et al., "Active UDDI—an Extension to UDDI for Dynamic and Fault-tolerant Service Invocation", pp. 91-99.

Inspec (AN7685623) Symposium on Applications and the Internet Workshops, Orlando, Jan. 27-31, 2003, Proceedings, Shaikhali, A. et al., "IDDIe: an Extended Registry for Web Services".

Inspec (AN7709755) Shen, D. R. et al., "Mechanism of e_UDDI Management of shared Resources in Virtual Enterprise", Jisuanji Jicheng Zhizao Xitong (Computer Integrated Manufacturing Systems, Beijing), vol. 9, issue 2, Feb. 2003 pp. 90-95.

* cited by examiner

UDDI METADATA QUERY DEVELOPMENT

BACKGROUND OF THE INVENTION

The present invention relates generally to Universal Description, Discovery and Integration (UDDI) metadata, and more particularly, to the development of a query for UDDI metadata.

The UDDI specification defines a form by which companies can publish and query each other's Internet services capabilities. UDDI business registries containing such information for various businesses may be searched to enable discovery of information about a business. The business information for each company that is stored in the UDDI business registries may be considered to be metadata, or data describing the registry for the business.

The UDDI registry metadata for a business may include discoveryURLs (Uniform Resource Locator) that provide a location of alternate URL addressable documents according to the UDDI Version 2.03 Data Structure Specification, incorporated herein by reference. The discoveryURLs are limited in size and are retrieved via an HTTP (Hyper Text Transfer Protocol) GET command, the results of which are not defined by the UDDI Data Structure Specification.

SUMMARY OF THE INVENTION

In accordance with one aspect of the present invention a method of developing a query for data in a UDDI registry comprises providing a URI query having parameters that identify the data, generating a UDDI query having a UDDI specified format based on the parameters in the URI query, and sending the UDDI query to the UDDI registry.

In accordance with another aspect of the present invention a system for developing a query for data in a UDDI registry comprises a URI query mechanism for providing a URI query having parameters that identify the data, a URI query dissection mechanism for generating a UDDI query having a UDDI specified format based on the parameters in the URI query, and an interface for sending the UDDI query to the UDDI registry.

In accordance with a further aspect of the present invention a computer readable medium having stored thereon computer-executable instructions for developing a query for data in a UDDI registry, the computer-executable instructions comprising providing a URI query having parameters that identify the data, generating a UDDI query having a UDDI specified format based on the parameters in the URI query, and sending the UDDI query to the UDDI registry.

Other aspects and features of the present invention will become apparent to those ordinarily skilled in the art upon review of the following description of specific embodiments of the invention in conjunction with the accompanying figures.

DETAILED DESCRIPTION OF THE INVENTION

Figure 1:
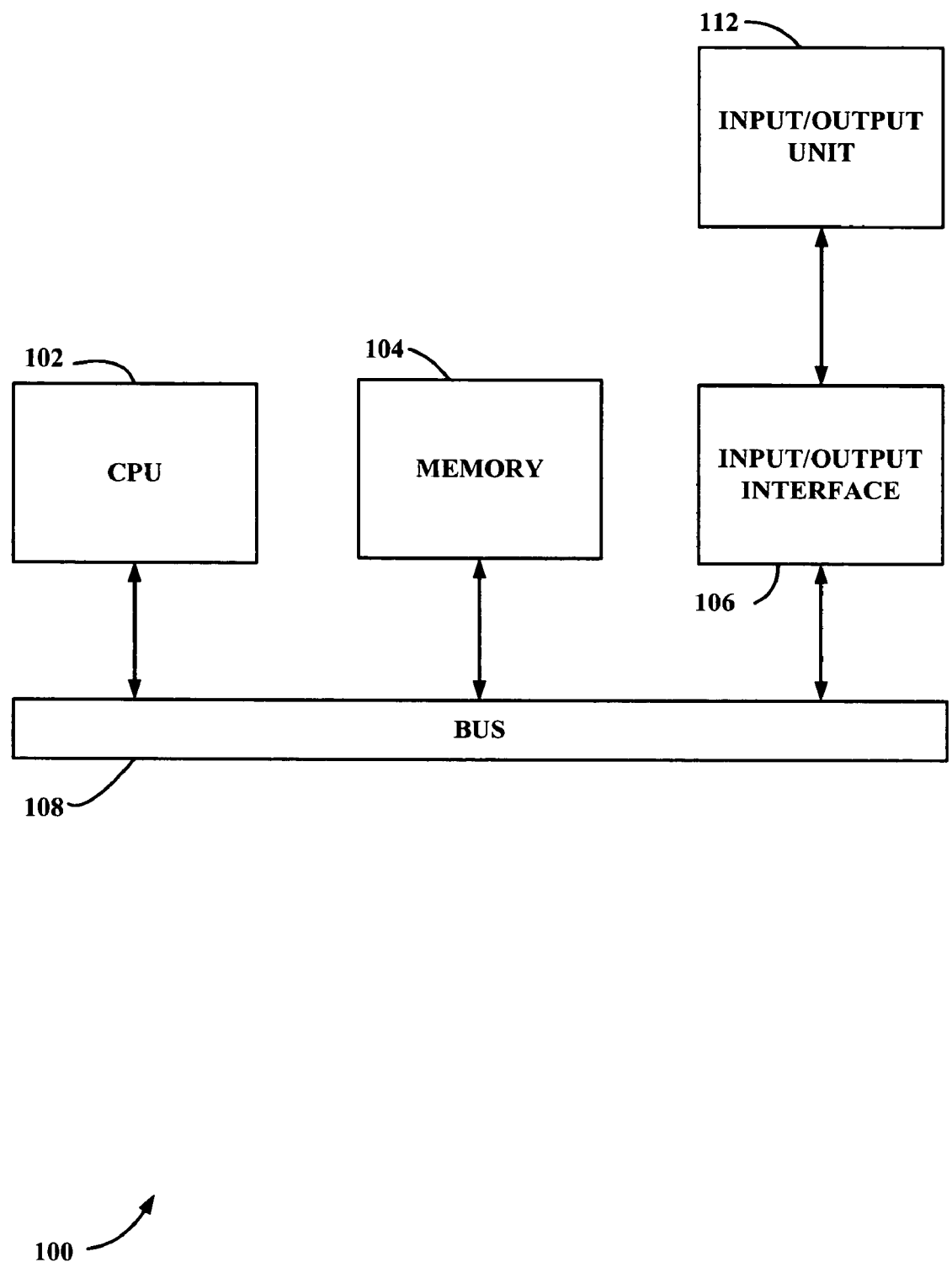
FIG. 1 is an exemplary computing environment in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates a configuration of a computing environment 100 in which the present invention may be implemented. The computing environment 100 includes a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112.

The CPU 102 can be a commercially available CPU or a customized CPU suitable for operations described herein. Other variations of CPU 102 can include a plurality of CPUs interconnected to coordinate various operations and functions. The computing environment 100 serves as an apparatus for performing the present method by the CPU 102.

The present invention pertains to the retrieval of metadata from a UDDI business registry. The computing environment 100 is in communication with at least one UDDI business registry either through the input/output unit 112 over a network or directly through the bus 108 depending on the configuration of the computing environment 100 and the UDDI business registry.

Figure 2:
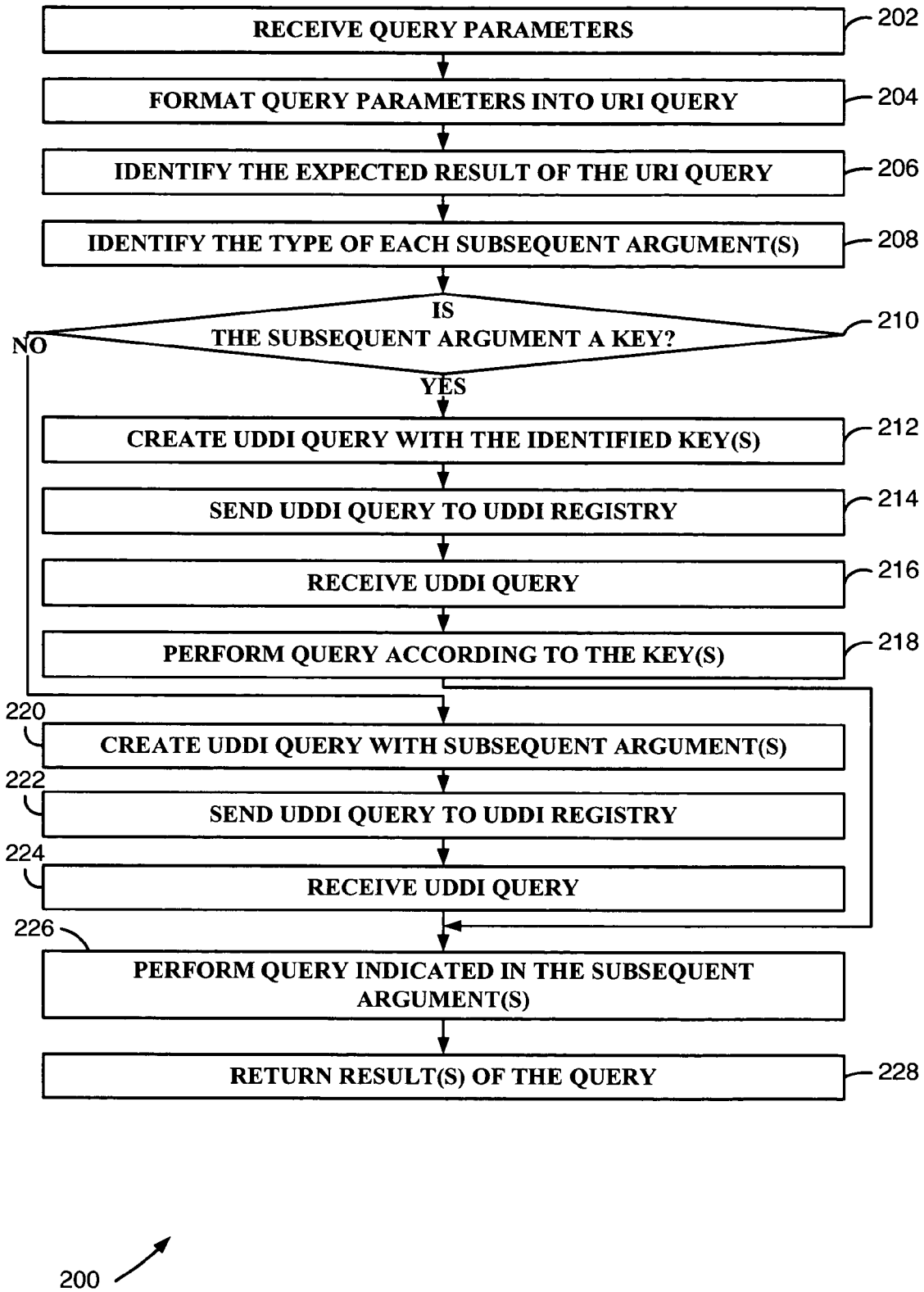
FIG. 2 illustrates a method for managing information retrieval for UDDI metadata.

FIG. 2 shows an exemplary method 200 for retrieving UDDI metadata from a UDDI business registry. Query parameters are received in step 202 from a user. These parameters contain identifiers for a UDDI business registry and associated metadata that is being sought. Such identifiers may include a location or identifier for a specific UDDI business registry to be searched as well as some identifier for the specific piece of metadata (or object) that is being searched for. The identifier for the object may be in the form of a key that can be used to obtain the metadata from the UDDI business registry, in the form of a query containing characteristics of the object that can be used as a basis for searching the registry, in the form of a taxonomy or any other such means identifying the metadata including a combination of the above. The parameters may be obtained through an interface such as a graphical user interface resulting in receipt of the parameters in an unspecified format, such as a series of separate parameters. Alternatively, the interface may bundle the parameters together and provide them in a particular format.

The parameters are used to create a query having a URI (uniform resource identifier) form in step 204. The exact form of the URI query depends on the information specified in the parameters; for example, the type of search that is to be performed for the object. The user specifies such information as the type of search.

If the parameters provided were keys for objects then the URI query may have the following form:
uddi<object>:object key:<object key>:object key:<URI to UDDI inquiry API>
(where only one key is provided and only one object sought)
uddi<object>:object key:<object key>:object key:<object key>:<URI to UDDI inquiry API>
(where more than one key is provided and more than one object is sought).

The strings enclosed by < > are parameters of the query whereas all other strings are keywords. In the URI query "uddi<object>" specifies the protocol of the query (i.e. UDDI) and the expected type of result from the query (i.e. <object>). The parameter <object key> is surrounded by the keyword "object key" to denote the start and in the first case the end of this parameter. In the second case, the keyword "object key" to the left of the parameter <object key> (preceding the parameter) denotes the type of parameters and the ":" symbol to the right of the <object key> parameter denotes the end of the parameter. The <object key> contains a unique key for the UDDI business registry metadata that is being sought.

The <URI to UDDI inquiry API> parameter contains information that is used for communication with a business registry. For example, the <URI to UDDI inquiry API> parameter may contain an address of a communication point of a business registry to which queries and requests are sent. Once communications between the source of the request are established with the registry after the request has been sent, a response is sent from the registry along the same communication channel from which the request was received.

Since the <object key> parameter uniquely identifies a single object, the number of results returned by this query will depend on the number of these parameters that are sent. For example, if the URI query contains only one <object key> then the query will return one result at most.

The <object> parameter is the document type that is expected to result from the URI query. If communication between the source sending the request and the registry is via Simple Object Access Protocol (SOAP), for example, then the resulting document is an XML (Extended Markup Language) document.

If the parameters provided through the interface specifies a query then the URI query may have the following form:
uddi<object>:query:<query>:query:<URI to UDDI inquiry API>

In the above URI query the keyword "query" indicates that the parameters in the URI query are in the form of a complete query. The parameter <query> contains the query to be executed and includes the parameters received from the interface in step 202. The <query> parameter may be a partial or complete name of a UDDI service. A UDDI service is a representation of an actual business service. Data representing such a service is stored for a UDDI service to enable a requesting source to invoke the business services and obtain results.

Since this URI query is based on the query indicated in the <query> parameter, there may be more than one object that meets this criteria, thus producing more than one result for the URI query.

If the parameters are in the form of a taxonomy then the URI query may have the following form:
uddi<object>:querytax:<taxonomy>:querytax:querytax:<taxonomy>querytax:....:<URI to UDDI inquiry API> or uddi<object>:querytax:<taxonomy>:querytax:<taxonomy>: . . . :<URI to UDDI inquiry API>.

The keyword "querytax" specifies that the parameter occurring after, <taxonomy>, is in the form of a taxonomy. As illustrated above, there may be multiple parameters and the keywords may be specified either before and after the parameter or only before the parameter, as long as the UDDI business registry receiving the URI query is aware of the form so that the query can be interpreted.

The URI query may also specify multiple types of parameters as shown in the example below:

uddi<object>:query: <query>:query:querytax:<taxonomy>:querytax: :<URI to UDDI inquiry API>.

or uddi<object>:query: <query>:querytax:<taxonomy:<URI to UDDI inquiry API>.

The above URI query forms provide specific exemplary forms of the query. The following illustrates the general form of the serialized URI query:

uddi<object>:"search type keyword 1":<parameter1>: "search type keyword 1":"search type keyword 2":<parameter1>: "search type keyword 2": . . . :<URI to UDDI inquiry API>.

or uddi<object>:"search type keyword 1":<parameter1>: "search type keyword 2": :<parameter2>: . . . :<URI to UDDI inquiry API>.

The URI query presents the query specified by the parameters in a serialized form. Such serialized queries allow the query to be stored for future use.

As illustrated above, there may be multiple parameters and the keywords may be specified either before and after the parameter or only before the parameter. The second form of the query showing only one occurrence of the keyword per parameter (as opposed to surrounding the parameter by the keyword) is useful if the parameter never ends in a colon. However, if the parameter may possibly end in a colon then the parameter is best surrounded by the keyword to identify the beginning and the end of the parameter.

The representation of the UDDI query as a URI query enables the query to be stored and re-used. The URI query is converted into a UDDI specified format in steps 206 to 210 and 220. Steps 202 to 214 and 220 to 222 take place at a user interface whereas steps 216 to 218 and 224 to 228 occur at the UDDI business registry.

The URI query is searched to locate the first ":" symbol which is used to separate the different components of the query. Although the ":" symbol is illustrated in this example, any symbol that will not be used as part of a keyword or parameter may be used in place of the ":" symbol. The type of result expected from the URI query is identified in step 206. The string preceding the ":" symbol identifies the type of query and the expected result. This string is extracted from the URI query and the "uddi" substring, representing the type of query, is removed to leave the expected result of the URI query. If the "uddi" substring is not found then this indicates that the URI query is of another form which may be identified or an error may be set. In the above exemplary URI query formats, the expected result type for the URI query is <object>.

After the expected result type is determined, the type of each of the subsequent parameter(s) and the parameter(s) themselves are identified in the URI query in step 208. This involves searching the URI query for the second occurrence of the ":" symbol. The string preceding this symbol is the keyword identifying the type of parameters. This string is extracted and analyzed to determine the type of parameter(s) and as a result, the type of URI search that will be performed. The third occurrence of the ":" symbol in the URI query is located. The preceding string contains the parameters for the query of the type that has already been determined. Alternatively, the URI query may be searched for a second occurrence of the previously identified string denoting the type of the parameter(s). Since the parameters are enclosed at the beginning and end of these keywords in one form of the URI query, the parameters will be located between the first and second occurrences of the string. These strings are assessed to determine if one of them is a key for the UDDI business registry that is being searched for in step 210.

After the second occurrence of the string denoting the type of the parameter(s) has been located (or the second occurrence of the ":" symbol), the remaining information in the URI query is searched to determine if there are any remaining parameters (as denoted by keywords). After all parameters identified by keywords have been located, the remaining information in the URI query is an identifier for the UDDI registry that is being searched. This identifier is used to establish communications with the UDDI registry and may be in the form of an address for the UDDI registry or some other such identifier.

If the subsequent argument is a key (as identified in step 210) then a UDDI query have the specified format is created in step 212 on the basis of the key(s). This UDDI query is sent to the UDDI registry in step 214.

The UDDI query is received by the UDDI registry in step 216. The UDDI query is then performed according to the type of the subsequent parameter(s) in steps 218 and 226. If the subsequent parameter(s) is a key (as determined in step 210) then the UDDI query received in step 216 indicates this and the query is performed according to the provided key(s) in step 218.

If the subsequent parameter(s) type (as identified in step 210) is not a key then an assumption is made that the type is "query". Such an assumption is made based on the different URI forms. As outlined above, there are two main forms: one providing keys and another providing a query (within the URI query). While FIG. 2 shows only two types of searches being identified and performed, the present invention is not restricted to these two types. Searching may be based upon any of a number of known techniques. As such, only two types of searches were identified in FIG. 2 for ease of illustration.

If the subsequent parameter type is "query" then a UDDI query having the specified format is created in step 220 on the basis of the parameters. This UDDI query is sent to the specified UDDI registry in step 222. The UDDI query is received by the UDDI registry in step 224 and is performed according to the query indicated in the subsequent parameters in step 226. After the queries in steps 218 and 226 are completed the result(s) of these queries is returned in step 228.

Figure 3:
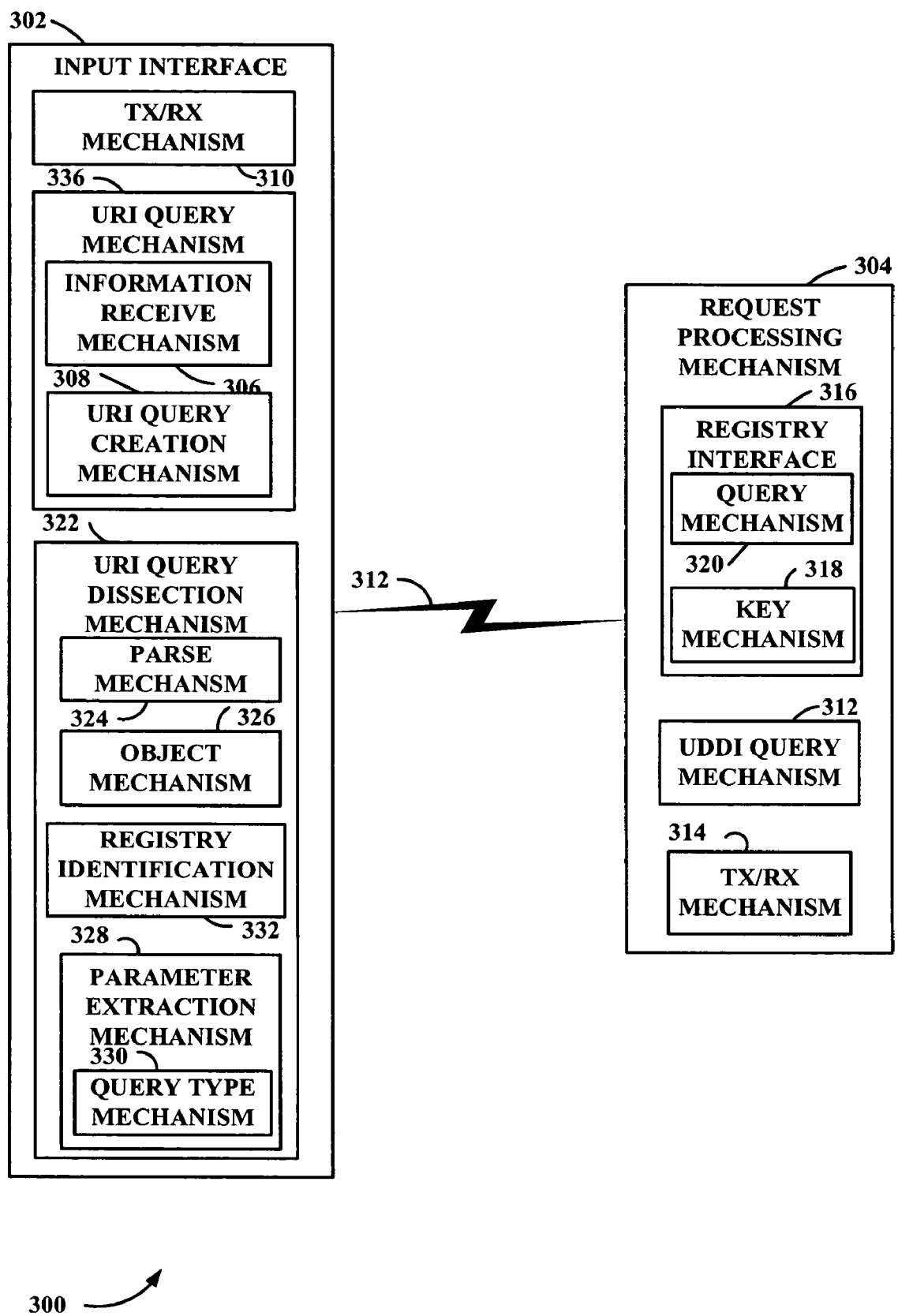
FIG. 3 is a system for managing information retrieval for UDDI metadata.

FIG. 3 shows a system 300 for retrieving metadata from a UDDI business registry. An input interface 302 is provided to receive parameters from a user and create a query therefrom. The query is sent via a communications link 312 from the input interface 302 to a request processing mechanism 304 in the UDDI business registry.

The input interface 302 includes URI query mechanism 336, a Tx/Rx mechanism 310 and a URI query dissection mechanism 322. The URI query mechanism 336 includes an information receive mechanism 306 and a URI query creation mechanism 308. The information receive mechanism 306 receives information input by the user. The information receive mechanism 306 passes this information to the URI query creation mechanism 308 along with metadata identifying the user input information (e.g. the field in the interface 302 that the information came from). The URI query creation mechanism 308 sorts through the user input information and formats a query in the formats described above incorporating the user input information. This query is in the form of a URI query which is passed to the URI query dissection mechanism 322.

The URI query dissection mechanism 322 includes a parse mechanism 324, an object mechanism 326, a registry identification mechanism 332, a parameter extraction mechanism 328 and a UDDI query mechanism 334. The parse mechanism 324 parses the URI query to identify the ":" symbols therein. As previously mentioned the ":" symbols are used to separate the various components of the URI query. After the first ":" symbol has been located the string prior to the ":" symbol is provided to the object mechanism 326.

The object mechanism 326 assess the string to determine the expected type of result for the query. The object mechanism 326 may search the provided string to identify and remove the "uddi" substring that identifies this query as an uddi query. If such a substring is not found then an error may be issued. The remainder of the string after the "uddi" substring contains the identification of the expected type of result. The remaining substring may be compared against known types of data and metadata contained in the UDDI business registry to confirm that the query is searching for a valid type of information. The type of results is passed to the registry interface 316.

The parse mechanism 324 parses the entire URI query to locate all of the ":" symbols therein. The string occurring after the last ":" symbol is provided to the registry identification mechanism 332. This string is extracted to provide the address for the UDDI registry to which the query will be sent. The information between the first and last ":" symbols are the parameters for the search and are provided to the parameter extraction mechanism 328.

The parameter extraction mechanism 328 includes a query type mechanism 330. The parameter extraction mechanism 328 analyzes the parameters to determine what type of parameters they are and the values of those parameters. This analysis may be based on finding a second occurrence of the same keyword that indicates the type of the parameters, thus denoting the end of a parameter or the next occurrence of a ":" symbol, based on the format of the URI query as discussed above. The keywords for the parameters are identified and provided to the query type mechanism 330 where they are compared against known types of parameters. The parameters extraction mechanism 328 provides the parameters and an indication of the type of the parameters to the UDDI query mechanism 334 where a UDDI query having the specified format is created to be sent to the UDDI registry.

The UDDI query mechanism 334 receives the appropriate parameters and an indication of the type of query that is to be performed. From this information the UDDI query mechanism 334 creates a UDDI query having a UDDI specified format. The UDDI query is provided to the Tx/Rx mechanism 310.

The Tx/Rx mechanism 310 is a transmission and receive mechanism that uses the communication link 312 to forward and receive information from the request processing mechanism 304 in UDDI business registry. The Tx/Rx mechanism 308 forwards the UDDI query to the UDDI business registry identified therein.

The request processing mechanism 304 is formed in the UDDI business registry for processing requests for metadata within. The request processing mechanism 304 comprises a Tx/Rx mechanism 314 and a registry interface 316. The Tx/Rx mechanism 314 transmits and receives information via the communication link 312 to receive requests and transmit results of the requests. Upon receipt of a request, the Tx/Rx mechanism 314 forwards the UDDI query to the registry interface 316.

The registry interface 316 includes a key mechanism 318 and a query mechanism 320 which each execute a different type of query. Depending on the type of the parameters received from the parameters extraction mechanism 328, the registry interface 316 will have one of the key mechanism 318 and the query mechanism 320 perform a search of the UDDI business registry for the metadata identified in the parameters. The registry interface 316 contains a separate mechanism for each type of search. Although only two mechanisms are shown for ease of illustration, there may be other mechanisms such as a taxonomy mechanism, etc.

The results obtained by the registry interface 316 are provided to the Tx/Rx mechanism 314 and sent to the input interface 302 over the communication link 312.

Figure 4:
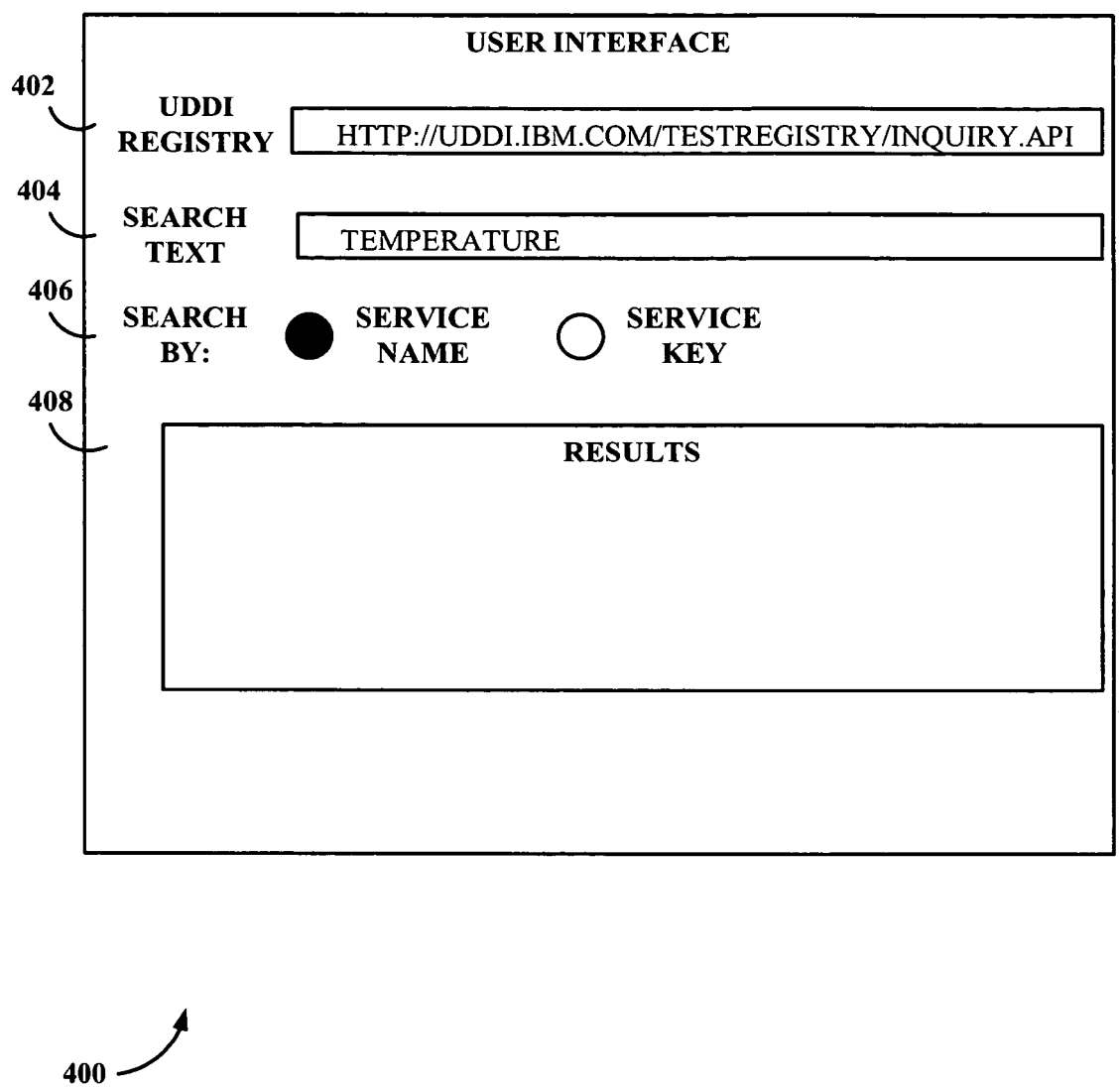
FIG. 4 illustrates an exemplary user interface for use with the method of FIG. 2.

FIG. 4 shows an exemplary graphical user interface 400 for receiving the query parameters to form a URI query for a UDDI business registry. The interface 400 includes a UDDI registry field 402, a search text field 404, a search form specification field 406 and a results field 408. The entry in the UDDI Registry field 402 is interpreted as the <URI to UDDI inquiry API> parameter. The Search Text field 404 is interpreted as either the <object key> or the <query> depending on the form of search specified by the user at 406.

The query in this example is for a UDDI service. Since the box 406 specifies this search to be "service name" type of search, the field 404 is considered to be a <query>. The URI query that is formulated from the information obtained from the interface 400 has the following form:

uddiservice:query:Temperature:query:http: //uddi.ibm-.com/testregistry/inquiryapi This query is sent to the UDDI registry "http://uddi.ibm-.com/testregistry/inquiryapi." The results received from this registry are then displayed in the results field 408.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

What is claimed is:

1. A method of developing a query for data in a UDDI registry comprising:
    providing a URI query having parameters that identify the data;
    generating a UDDI query having a UDDI specified format based on the parameters in the URI query; and
    sending the UDDI query to the UDDI registry, wherein
    generating a UDDI query having a UDDI specified format based on the parameters in the URI query comprises:
    identifying an expected result from the URI query;
    identifying each of the parameters and their associated keywords from the URI query; and
    creating the UDDI query incorporating the identified parameters according to their associated keywords.

2. The method according to claim 1, wherein providing a URI query having parameters that identify the data comprises:
    receiving the parameters from an input by a user; and
    forming the parameters into the URI query based on an expected outline of the URI query.

3. The method according to claim 2, wherein forming the parameters into the URI query based on an expected outline of the URI query comprises:
    identifying types for the parameters;
    selecting keywords to denote the types of the parameters; and
    building the URI query according to the selected keywords, the parameters and the expected outcome of the URI query.

4. The method according to claim 1, wherein identifying each of the parameters and their associated keywords from the URI query comprises:
    identifying a query type for the URI query based on the keywords therein; and
    identifying an address for the UDDI registry in the parameters; and
    wherein creating the UDDI query incorporating the identified parameters according to their associated keywords comprises:
    selecting parameters from the URI query identify the query type; and
    creating the UDDI query according to the query type and incorporating the selected parameters.

5. A system for developing a query for data in a UDDI registry comprising:
    a URI query mechanism for providing a URI query having parameters that identify the data;
    a URI query dissection mechanism for generating a UDDI query having a UDDI specified format based on the parameters in the URI query; and
    an interface for sending the UDDI query to the UDDI registry, wherein
    the URI query dissection mechanism comprises:
    an object mechanism for identifying an expected result from the URI query;
    a parameter extraction mechanism for identifying each of the parameters and their associated keywords from the URI query; and
    a UDDI query mechanism for creating the UDDI query incorporating the identified parameters according to their associated keywords.

6. The system according to claim 5, wherein the URI query mechanism comprises:
    an information receive mechanism for receiving parameters from an input by a user; and
    a URI query creation mechanism for forming the parameters into the URI query based on an expected outcome of the URI query.

7. The system according to claim 5, wherein the parameter extraction mechanism comprises a query type mechanism for identifying a query type for the URI query based on the keywords therein.

8. The system according to claim 5, wherein the URI query dissection mechanism comprises a registry identification mechanism for identifying an address for the UDDI registry in the parameters.

9. A computer program product for developing a query for data in a UDDI registry, the computer program product comprising:
    a computer readable storage medium having computer readable program code embodied therein, the computer readable program code comprising:
    computer readable program code configured to provide a URI query having parameters that identify the data;
    computer readable program code configured to generate a UDDI query having a UDDI specified format based on the parameters in the URI query; and
    computer readable program code configured to send the UDDI query to the UDDI registry, wherein
    the computer readable program code configured to generate a UDDI query having a UDDI specified format based on the parameters in the URI query comprises:
    computer readable program code configured to identify an expected result from the URI query;
    computer readable program code configured to identify each of the parameters and their associated keywords from the URI query; and
    computer readable program code configured to create the UDDI query incorporating the identified parameters according to their associated keywords.

10. The computer program product of claim 9, wherein the computer readable program code configured to provide a URI query having parameters that identify the data comprises:
    computer readable program code configured to receive parameters from an input by a user; and
    computer readable program code configured to form the parameters into the URI query based on an expected outline of the URI query.

11. The computer program product of claim 10, wherein the computer readable program code configured to form the parameters into the URI query based on an expected outline of the URI query comprises:
    computer readable program code configured to identify types for the parameters;
    computer readable program code configured to select keywords to denote the types of the parameters; and
    computer readable program code configured to build the URI query according to the selected keywords, the parameters and the expected outcome of the URI query.

12. The computer program product of claim 9, wherein the computer readable program code configured to identify each of the parameters and their associated keywords from the URI query comprises:

computer readable program code configured to identify a query type for the URI query based on the keywords therein; and computer readable program code configured to identify an address for the UDDI registry in the parameters; and wherein the computer readable program code configured to create the UDDI query incorporating the identified parameters according to their associated keywords comprises:

computer readable program code configured to select parameters from the URI query identify the query type; and computer readable program code configured to create the UDDI query according to the query type and incorporating the selected parameters.

* * * * *